(12) United States Patent
Duplinskiy et al.

(10) Patent No.: US 10,171,237 B2
(45) Date of Patent: Jan. 1, 2019

(54) HIGH-SPEED AUTOCOMPENSATION SCHEME OF QUANTUM KEY DISTRIBUTION

(71) Applicant: International Center for Quantum Optics & Quantum Technologies LLC, Skolkovo (RU)

(72) Inventors: Alexandr Valerievich Duplinskiy, Moscow (RU); Vasily Evgenyevich Ustimchik, Moscow (RU); Yuri Vladimirovich Kurochkin, Moscow (RU); Vladimir Leonidovich Kurochkin, Moscow (RU); Alexander Vitalievich Miller, Moscow (RU)

(73) Assignee: Inernational Center for Quantum Optics & Quantum Technologies LLC, Skolkovo (RU)

( * ) Notice: Subject to any disclaimer, the term of this patent is extended or adjusted under 35 U.S.C. 154(b) by 0 days.

(21) Appl. No.: 15/854,298

(22) Filed: Dec. 26, 2017

(65) Prior Publication Data
US 2018/0191496 A1 Jul. 5, 2018

(30) Foreign Application Priority Data
Dec. 29, 2016 (RU) ................................ 2016152338

(51) Int. Cl.
*H04B 10/70* (2013.01)
*H04B 10/85* (2013.01)
(Continued)

(52) U.S. Cl.
CPC .......... *H04L 9/0852* (2013.01); *H04B 10/70* (2013.01); *H04B 10/85* (2013.01); *G02F 1/035* (2013.01);
(Continued)

(58) Field of Classification Search
None
See application file for complete search history.

(56) References Cited

U.S. PATENT DOCUMENTS

| | | | | |
|---|---|---|---|---|
| 6,438,234 B1 * | 8/2002 | Gisin | ................... | H04L 9/0852 380/256 |
| 2003/0231771 A1 * | 12/2003 | Gisin | ................... | H04L 9/0852 380/255 |
| 2005/0100351 A1 * | 5/2005 | Yuan | ..................... | H04B 10/70 398/214 |

OTHER PUBLICATIONS

Peev et al., "The SECOQC quantum key distribution network in Vienna", 2009, New Journal of Physics, Institute of Physics: Open Access Journals 11, pp. 1-36.*

(Continued)

*Primary Examiner* — Kenneth N Vanderpuye
*Assistant Examiner* — David W Lambert
(74) *Attorney, Agent, or Firm* — Bardmesser Law Group

(57) ABSTRACT

The invention relates to quantum cryptography, and includes a communication system for transmitting a cryptographic key between the ends of a channel, including a transmitting node (Alice) comprising a beam splitter, an electro-optical attenuator, an amplitude modulator, a phase modulator, a storage line, a Faraday mirror, a synchronization detector; a receiving node (Bob) that includes avalanche photodiodes, a beam splitter, a circulator, a delay line, a phase modulator, a polarizing beam splitter, a Mach-Zehnder interferometer, and also a quantum channel for connecting these nodes. In this case, for the storage line is placed between the electro-optical phase modulator of the sender and the Faraday mirror. The limiting frequency of the laser pulse repetition at a fixed value of their width is increased, which makes it possible to use an autocompensation circuit at a frequency corresponding to the width of the laser pulse, which is the maximum possible result.

6 Claims, 3 Drawing Sheets

(51) Int. Cl.
H04L 9/08 (2006.01)
G02F 1/21 (2006.01)
G02F 1/035 (2006.01)
G02F 1/225 (2006.01)

(52) U.S. Cl.
CPC ........ *G02F 1/225* (2013.01); *G02F 2001/212* (2013.01)

(56) References Cited

OTHER PUBLICATIONS

Vladimir et al., "Quantum Cryptography", Jul. 2009, IEEE 10th International Conference and Seminar EDM'2009, Section III, pp. 166-170.*

* cited by examiner

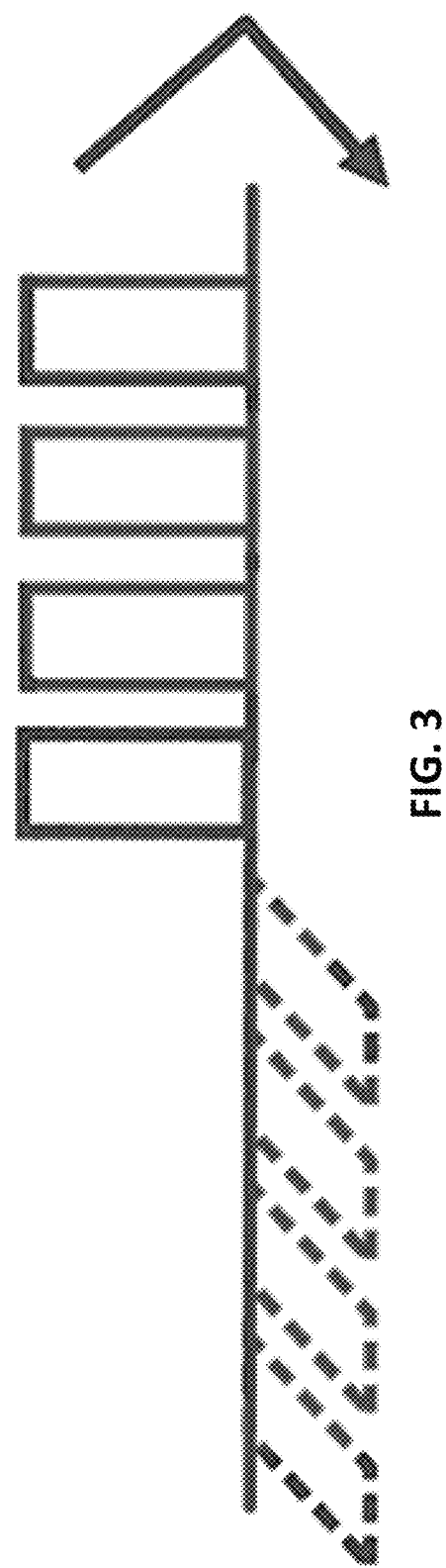

HIGH-SPEED AUTOCOMPENSATION SCHEME OF QUANTUM KEY DISTRIBUTION

CROSS-REFERENCE TO RELATED APPLICATIONS

The present application claims priority to RU patent application no. 2016152338, filed on Dec. 29, 2016, which are incorporated herein by reference in their entirety.

BACKGROUND OF THE INVENTION

Field of the Invention

The invention relates to information protection, and, more particularly, to quantum cryptography.

Description of the Related Art

Conventional art includes U.S. Pat. No. 6,188,768 entitled "Auto compensation scheme for the quantum distribution of a cryptographic key based on a polarization separation of light", published Feb. 13, 2001. This patent describes basic information and technical solutions used for an auto-compensation optical scheme for quantum key distribution. In such an optical scheme, when the pulses propagate in one direction and then back, the inverse Rayleigh scattering of light can significantly increase the noise signals from detectors operating in the mode of recording single photons during the generation of a quantum key. As a result, impulses are sent in small packets, between which there are significant time pauses necessary for the passage of light through the circuit.

An article "Automated 'plug and play' quantum key distribution", published in Journal of Electronics Letters (Volume: 34, Issue: 22, 29 Oct. 1998) partly addresses the above problem by adding a storage line on the sender's side. However, it is necessary to modulate the pulses when moving in both directions due to the polarization sensitivity of the phase modulator. The mutual arrangement of the phase modulator and the Faraday mirror on the sender side in the above scheme imposes significant limitations on the maximum pulse repetition rate.

Accordingly, there is a need in the art for a more effective auto-compensation scheme for quantum key distribution, in order to increase the limiting frequency of the laser pulse repetition at a fixed value of their width.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 shows a model of pulse repetition before and after reflection from the Faraday mirror in the inventive the auto-compensation scheme.

DETAILED DESCRIPTION OF EMBODIMENTS OF THE INVENTION

Reference will now be made in detail to the preferred embodiments of the present invention, examples of which are illustrated in the accompanying drawings.

The technical result coincides with the problem and allows using the auto-compensation scheme at a frequency corresponding to a period equal to the width of the laser pulse, which is in principle the maximum possible result.

The technical result is achieved by using a communication system for transmitting a cryptographic key between the ends of a channel, where the communication system includes— a. A transmission node (Alice) comprising a beam splitter, an electro-optical attenuator, an amplitude modulator, a phase modulator, a storage line, a Faraday mirror, and a synchronization detector;

b. A receiver node (Bob) comprising a laser, an avalanche photodiodes, beam splitter, a circulator, a delay line, a phase modulator, a polarizing beam splitter, a Mach-Zehnder interferometer; and c. A quantum channel for connecting the specified nodes.

The storage line is placed between the sender's electro-optical phase modulator and the Faraday mirror. Changing the position of the accumulation line makes it possible to exclude the intersection of pulses moving in different directions through the sender's phase modulator. As a result, it becomes possible to increase the repetition rate to the maximum permissible value. The maximum allowable frequency corresponds to a period equal in duration to the pulse width at the base. A further increase in frequency will result in an intersection of neighboring pulses, which will lead to an increase in the error rate in the final key.

In conventional art, the time required for the pulses to travel from the phase modulator to the Faraday mirror and vice versa is much shorter than the time required for the train of pulses, which leads to intersection of signals traveling in different directions in the phase modulator. Thus, for correct modulation of the states transmitted by the sender, it is necessary to make time intervals between the pulses in the train, so as to avoid overlapping of incoming and reflected pulses. This leads to a decrease in the speed of key generation.

The auto-compensation scheme consists of a transmitter and a receiver (traditionally referred to in cryptography as Alice and Bob, respectively), which are interconnected by single-mode fiber. The transmission of optical signals is organized as follows.

Figure 1:
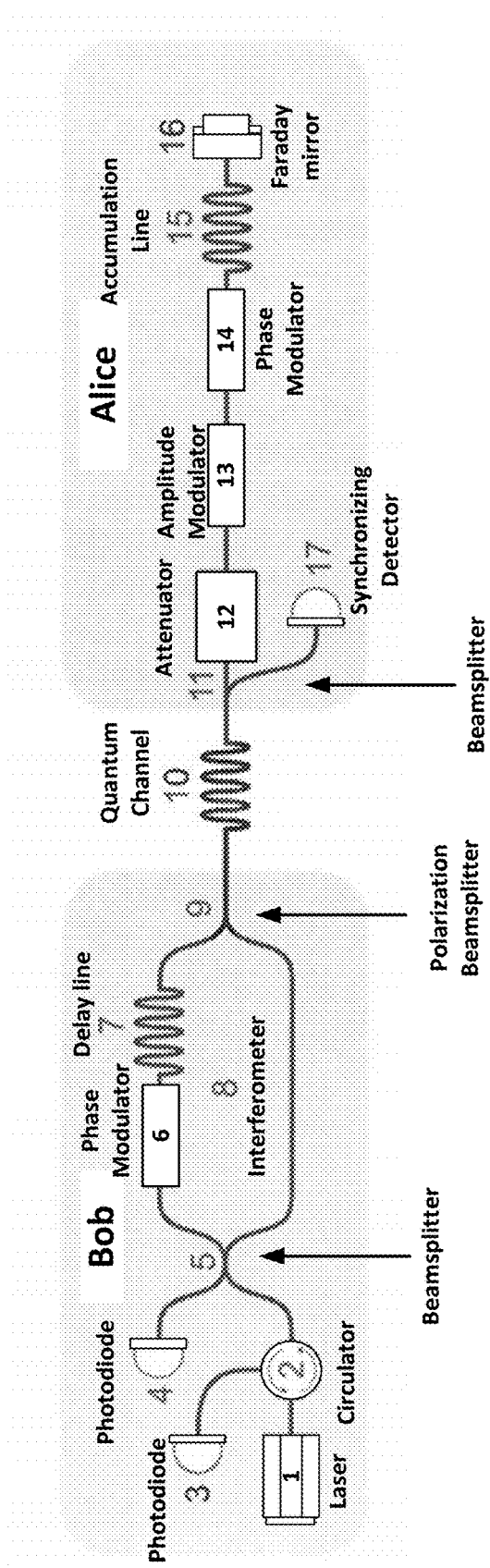
FIG. 1 shows an autocompensation scheme of the quantum key distribution in the proposed invention.

FIG. 1 shows the autocompensation scheme of the quantum key distribution in the proposed modification. The following components are used:

The transmitting node (Alice): Beam splitter 11; Electro-optic attenuator 12; Amplitude modulator 13; Phase modulator 14; Accumulation line 15; Faraday's mirror 16; Synchronizing detector 17.

Receiving unit (Bob): Laser 1; Circulator 2; Avalanche photodiodes 3, 4; Beam splitter 5; Phase modulator 6; Delay line 7; Mach-Zehnder interferometer 8; Polarization beam splitter 9. Quantum channel 10.

Figure 2:
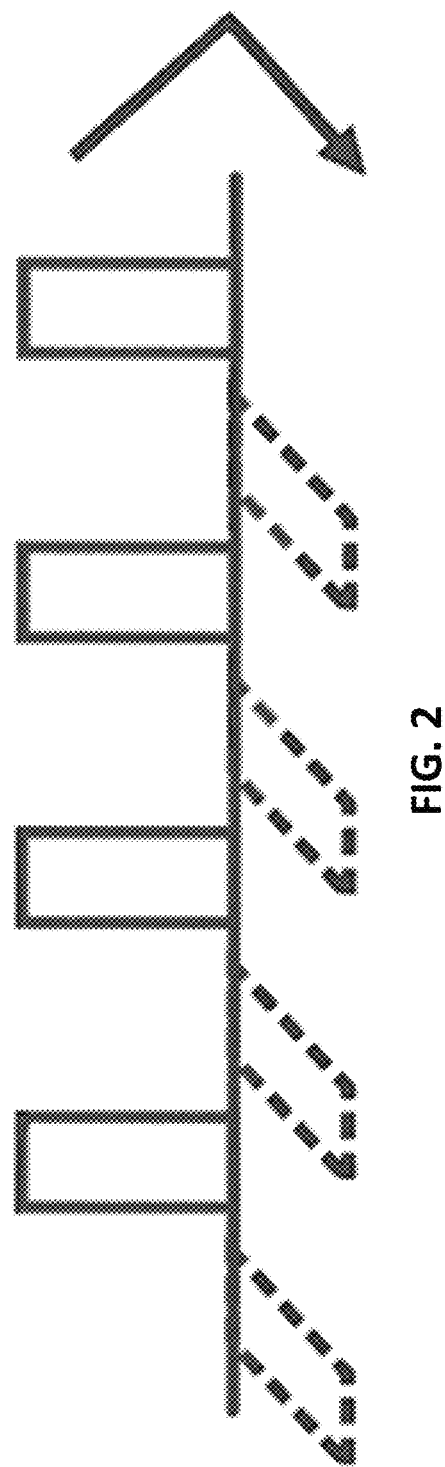
FIG. 2 shows a model of pulse repetition before and after reflection from the Faraday mirror in the auto-compensation scheme in the initial configuration.

FIG. 2 shows a model of pulse repetition before and after reflection from the Faraday mirror in the auto-compensation scheme in the initial configuration. Solid lines denote the impulses that arrived, dashed—reflected.

FIG. 3 shows a model of pulse repetition before and after reflection from the Faraday mirror in the presented modification of the auto-compensation scheme. Solid lines denote the impulses that arrived, dashed—reflected.

The laser on the Bob side emits a multiphoton optical pulse with linear polarization in the spectral range around 1550 nm, which passes through circulator 2 (see again FIG. 1) and is directed to the beamsplitter 5. The function of the circulator is to direct the light to the necessary outputs. From the laser, it transfers it to the beamsplitter 5, and when the light returns from the beam splitter 5—sends it to the detector 3. The circulator can be made in the form of a fiber optic element on the crystal.

Then one part of the pulse arrives at the input of the polarizing beam splitter 9 over the short arm of the Mach-Zehnder fiber interferometer (8). The second part of the pulse arrives at the polarizing beamsplitter 9, passing a long arm formed by the delay line and the fiber-optic phase modulator 6. The optical elements in the long arm are made of a polarization-maintaining optical fiber. This allows orienting the polarization of the radiation so that both parts of the pulse exit through the output of the polarization beamsplitter 9 and go from Bob to Alice over an extended single-mode optical fiber (traditionally called the quantum communication channel [10]).

After the passage of the quantum channel, the laser pulse arrives at the input of Alice, passes the phase modulator 14, the storage line 15, and is reflected from the Faraday mirror 16, which turns the polarization of the electromagnetic radiation by 90° to compensate for the polarization distortions of the optical fiber. On the way back, at the exit from Alice, the laser pulse is attenuated by a tunable attenuator 12 to a single-photon level (the average number of photons per pulse is 0.1-0.3). The photons returning from Alice to Bob have a linear polarization rotated by 90°, so they are directed to the other arm of the interferometer by the input polarizing beamsplitter 9, after which they are connected at the output, where interference takes place. The result of the interference is detected by the avalanche photodiode 4 in one arm or, after passing through the circulator 2, on the avalanche photodiode 3 in the other arm. Since these two parts of the pulse travel the same way, and in the reverse order inside Bob, this interferometer is automatically compensated.

To implement the BB84 protocol Alice, using the phase modulator 14 applies a proper phase shift of 0 or $\pi$ (first basis), and $\pi/2$ or $3\pi/2$ (second basis) to light pulses arriving from Bob. Since after the passage of the quantum channel, the pulse has a random polarization, and the phase modulator applies phase shift only along one of the axes, Alice modulates each pulse twice—first, on the way to the Faraday mirror 16, and then, when traveling in the opposite direction, with rotated polarization. Bob, after receiving single photons reflected from Alice randomly chooses a basis for the measurement, applying phase shift 0 (first base), or $\pi/2$ (second base) at phase modulator 6 at the appropriate time.

In such an optical scheme, when the pulses propagate forward and backward, the backward Rayleigh scattering of light can significantly increase the noise detected by the detectors 3 and 4 operating in the mode of single photon detection during the generation of a quantum key. Therefore, the laser emits pulses not constantly, but sends trains of pulses in each transmission cycle, the length of these trains corresponding to the length of the accumulation line 15, set for this purpose in the optical Alice circuit. Due to this, single-photon pulses propagating back do not intersect anymore in a quantum channel with multiphoton pulses going from Bob to Alice. Thus, for a storage line of 25 km in length, a train of pulses contains 120,000 pulses at a clock frequency of sending laser pulses of 500 MHz.

The process of generating a quantum key is as follows. At the first stage, the fiber optic communication channel is calibrated and tuned. For this purpose, the length of the optical channel is accurately measured using multiphoton pulses from Bob, while the adjustable attenuator 12 for Alice is set to full transmission. Bob receives the reflected signal and, based on these measurements, sets the time position of the gate for detectors 3 and 4 when they need to register the signal. Detectors in this case operate in a linear mode for recording multiphoton light pulses.

After this, the quantum key generation mode is set. The reverse voltage on avalanche photodiodes rises above the threshold breakdown voltage, and they go into single-photon registration mode (Geiger pulse counting mode). Bob emits a train of laser pulses. Next, the Alice beam splitter 11 directs a portion of the radiation power of the incoming light pulses to the synchronization detector 17. It generates a trigger signal that is used to synchronize Alice with Bob. Synchronization allows Alice to apply an electrical impulse to the phase modulator at the right time to modulate the phase of the optical pulse, in accordance with the BB84 protocol. The attenuator 12 in Alice is open for transmission. When the pulse train fills the storage line 15, this fast, electrically controlled attenuator reduces its transmission to such a level that light pulses with a photon content of 0.1-0.3 photons per pulse emerge from Alice to Bob. Under such conditions, a probability Pn to find n photons in a laser pulse obeys Poisson statistics:

$$P_n = \frac{(\bar{n})^n}{n!} e^{-\bar{n}} \quad (1)$$

where $\bar{n}$—is the average number of photons per pulse. In quantum cryptography, a pulse is considered at the single-photon level, if $\bar{n}$ is between 0.1-0.2. Thus, for $\bar{n}$=0, 1 the proportion of two-photon pulses is 5% of single-photon and three-photon—0.16%. In practice, in this case, for every 10 pulses in 9, there are 0 photons.

Alice remembers the index of each pulse within a train and the value of the phase applied by the modulator. Bob writes to the buffer and sends to the computer both the sequence number of the pulse and the basis for measuring single photons registered by the detectors 3 and 4. Based on this data, using an open channel between their computers, Alice and Bob form the same quantum key.

Electro-optical phase modulators add a phase shift along the selected polarization direction of the transmitted radiation. Since after the passage of the quantum channel the polarization will randomly change due to external influences, the pulse arriving at the Alice phase modulator will have a random polarization state. Thus, its phase will be modulated only partially—along one of the components. However, the rotation of the polarization by 90° by the Faraday mirror makes it possible to apply the necessary phase shift to the orthogonal component, at the moment of the pulse passing in the opposite direction. As a result, correct modulation can be carried out if the same phase shift on the modulator is applied when the pulse moves in both directions.

The difference from conventional art is in changing the location of the storage line on the side of Alice. In the conventional art configuration, it is necessary for the time between adjacent pulses in the train to be greater than the time of passage of the pulse through the crystal. It is also necessary to accurately determine the distance between a modulator and a Faraday mirror in such a way that incoming and reflected pulses do not pass through the modulator at the same time, otherwise, it becomes impossible to assign them different, randomly chosen phases. The time interval between pulses in the train increases the period of their following, thereby decreasing the frequency and total speed of the key generation.

The key sending speed is expressed as:

$$\vartheta = sT\nu \quad (2)$$

Where s is repetition of trains of duty cycle, equal to the ratio of a train to a period of propagation, T is the duration of a single pulse train, ν is the pulse repetition frequency within the same train. The duration of the train is determined by the length of the storage line used at the receiver side:

$$T = \frac{Ln}{c} \quad (3)$$

Where L—is the length of the storage line, n—the refractive index of the fiber, c—speed of light in vacuum.

The maximum pulse repetition frequency in the reduced configuration is seen in FIG. 2, and is determined by the doubled length of the crystal in the modulator, since it is necessary to spatially separate the impulses going in different directions. In this way:

$$\nu = \frac{1}{2t_m} \quad (4)$$

Where $t_m$—the pulse of traffic through the crystal phase modulator.

Thus, the final formula for the key sending speed:

$$\vartheta_{basic} = \frac{Lns}{2ct_m} \quad (5)$$

In the proposed solution, the storage line 15 is located between the Alice phase modulator and the Faraday mirror. Thus, the whole train of pulses first passes through the phase modulator in one direction, getting into the storage line, and then, reflecting, in the same order passes in the opposite direction. In this configuration, pulses moving in both directions will never intersect at the modulator, which allows them to be placed as close as possible to each other, increasing the repetition frequency to the maximum possible for a given pulse width, as shown in FIG. 3. Thus, the pulse repetition rate in the proposed configuration is:

$$\nu = \frac{1}{t_p} \quad (6)$$

Since the modification does not affect the other parameters of the circuit, the final key sending speed:

$$\vartheta_{mod} = \frac{Lns}{ct_p} = 2\frac{t_m}{t_p}\vartheta_{basic} \quad (7)$$

A typical crystal length, for example, of lithium niobate ($LiNbO_3$), in electro-optical modulators is about 7 cm. Thus, the time of light propagation in a crystal is about 500 ps. At the same time, with the help of modern electronics (programmable logic integrated circuits), it is possible to generate laser pulses that are much shorter (100 ps and less). With the above parameters, the speed of sending the key in the auto-compensation scheme increases by more than 10 times.

The proposed modification makes it possible to significantly increase the maximum repetition rate of laser pulses, without affecting the other parameters of the circuit. Thus, the maximum speed of sending the key increases substantially.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A communication system for transmitting a cryptographic key across a channel, comprising:
   a transmission node ("Alice") including a beam splitter, an electro-optical attenuator, an amplitude modulator, an electro-optical phase modulator, a storage line, a Faraday mirror, and a synchronization detector, wherein the storage line directly connects the Faraday mirror and the electro-optical phase modulator;
   a receiver node ("Bob") including a laser, avalanche photodiodes, a beam splitter, a circulator, a delay line, an electro-optical phase modulator, a polarizing beam splitter, and a Mach-Zehnder interferometer connected between the beam splitter and the polarizing beam splitter; and
   a quantum channel connecting the transmission and receiver nodes,
   wherein the storage line is placed between the electro-optical phase modulator of the transmission node and the Faraday mirror.

2. The system of claim 1, wherein the laser emits light at a wavelength of 1555 nm.

3. The system of claim 1, wherein the electro-optical phase modulators are based on a lithium niobate ($LiNbO_3$) crystal and are used to change a phase of a laser beam transmitted through the quantum channel.

4. A communication system for transmitting a cryptographic key, comprising:
   a transmission node including a beam splitter, an electro-optical attenuator, an amplitude modulator, an electro-optical phase modulator, a storage line, a Faraday mirror, and a synchronization detector, wherein the storage line directly connects the Faraday mirror and the electro-optical phase modulator;
   a receiver node including a laser, avalanche photodiodes, a beam splitter, a circulator, a delay line, an electro-optical phase modulator, a polarizing beam splitter, and a Mach-Zehnder interferometer connected between the beam splitter and the polarizing beam splitter; and
   a channel connecting the transmission and receiver nodes,
   wherein the storage line is between the electro-optical phase modulator of the transmission node and the Faraday mirror.

5. The system of claim 4, wherein the laser emits light at a wavelength of 1555 nm.

6. The system of claim 4, wherein the electro-optical phase modulators are based on a lithium niobate (LiNbO$_3$) crystal and are used to change a phase of a laser beam transmitted through the quantum channel.

* * * * *